United States Patent [19]

Fahey

[11] 4,220,872
[45] Sep. 2, 1980

[54] DC POWER SUPPLY CIRCUIT

[75] Inventor: Robert J. Fahey, Burlington, Mass.

[73] Assignee: GTE Sylvania Incorporated, Stamford, Conn.

[21] Appl. No.: 973,201

[22] Filed: Dec. 26, 1978

[51] Int. Cl.² .......................... H02J 1/00; H02J 9/00
[52] U.S. Cl. ..................................... 307/32; 307/66; 323/25
[58] Field of Search ............... 307/31, 32, 66; 323/4, 323/25; 320/39

[56] References Cited

U.S. PATENT DOCUMENTS

| | | | |
|---|---|---|---|
| 3,696,286 | 10/1972 | Ule | 307/66 X |
| 3,914,684 | 10/1975 | Leidich | 307/32 X |
| 3,943,431 | 3/1976 | Hareyama | 307/32 X |
| 4,075,504 | 2/1978 | Gnaedinger | 307/66 |
| 4,091,319 | 5/1978 | Nguyen | 307/66 X |

Primary Examiner—Robert J. Hickey
Attorney, Agent, or Firm—Peter Xiarhos

[57] ABSTRACT

A dc power supply circuit for supplying simultaneously dc voltages to a dc load and to a standby battery employed to power the load upon a loss of dc power to the load. The load is adapted to draw varying amounts of current.

The dc power supply circuit in accordance with the invention includes a capacitor which is arranged to retain a dc voltage derived from an ac voltage. A fixed voltage regulator circuit coupled to the capacitor operates to supply a fixed dc voltage to the load and to maintain this voltage as the current drawn by the load varies. An adjustable voltage regulator circuit coupled to the capacitor operates to supply a varying dc voltage to the battery as the current drawn by the load varies. The varying voltage of the adjustable voltage regulator circuit is achieved by a current sensing resistor which senses the current drawn jointly by the load and the battery and which causes control circuitry coupled to the adjustable voltage regulator circuit to vary the dc voltage thereof in accordance with variations in the current sensed by the current sensing resistor. In accordance with the invention, the current drawn jointly by the load and battery is limited to a predetermined maximum amount, for example, one ampere, with the load being supplied first and at all times with its needed current and the difference between the current drawn by the load at any given instant and one ampere being made available to the battery.

10 Claims, 1 Drawing Figure

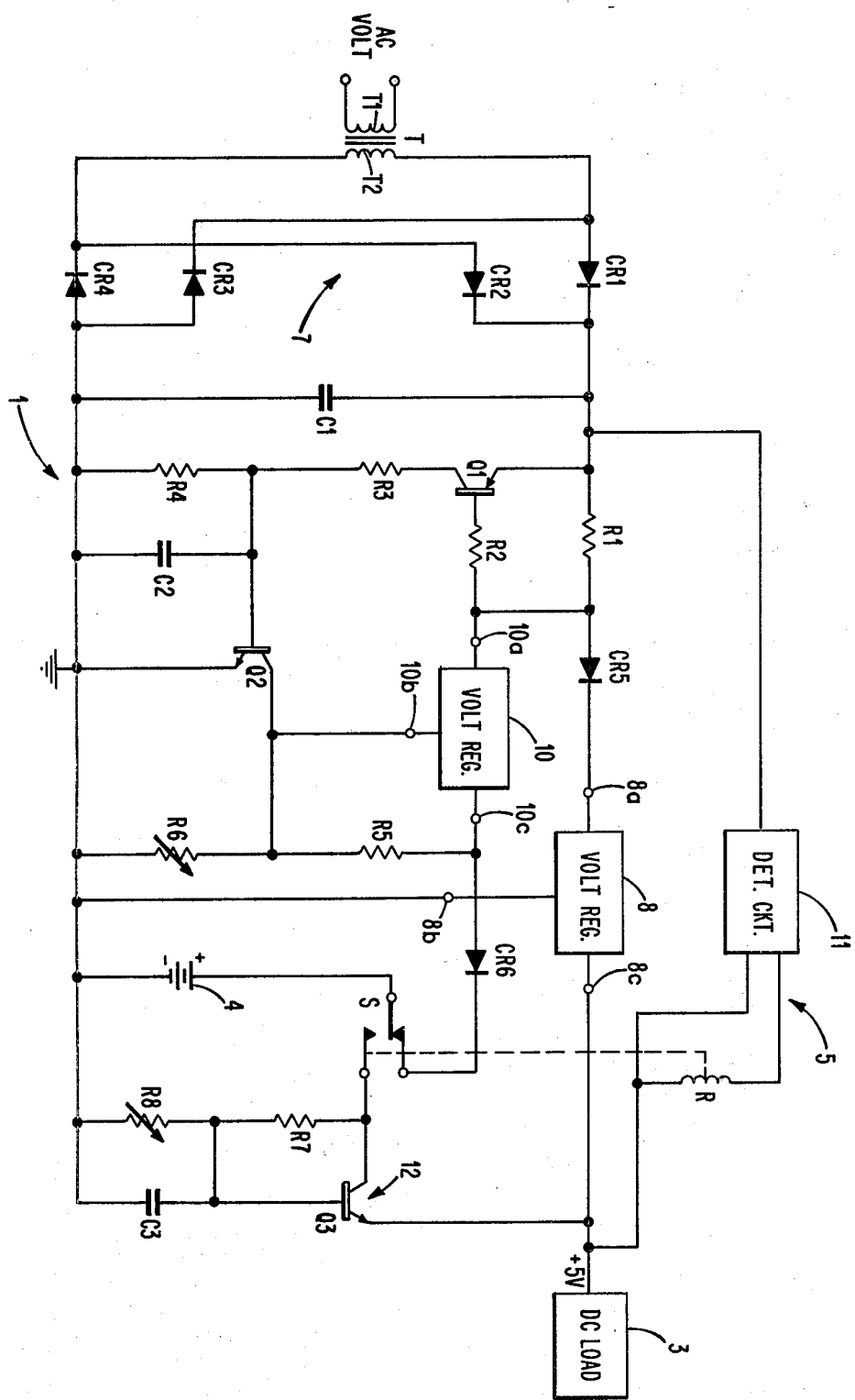

DC POWER SUPPLY CIRCUIT

CROSS-REFERENCE TO RELATED APPLICATION

In co-pending patent application Ser. No. 973,218, filed concurrently herewith in the name of Robert J. Fahey, entitled DETECTOR CIRCUIT, and assigned to the same assignee as the present application, there is disclosed and claimed a detector circuit which may be used with the dc power supply circuit of the present invention.

BACKGROUND OF THE INVENTION

The present invention relates to a power supply circuit and, more particularly, to a dc power supply circuit for supplying simultaneously dc voltages to a dc load and to a standby battery while apportioning the values of currents to the dc load and the standby battery on a varying basis.

There are many applications in which it is desired to supply a dc voltage to a dc load while having available a standby dc storage source, such as an electrical storage battery, which may be connected to the load in the event the voltage supplied to the load is terminated or reduced in value for some reason, for example, due to a loss of ac line voltage or failure of components used to derive dc voltages from the ac line voltage. In addition, in those cases where the load may draw varying amounts of current, for example, due to components thereof having varying power demands and/or duty cycles, it may be desirable to apportion the currents between the load and the standby battery on a varying basis so that current not required or drawn by the load may be made available to the battery so as to increase the voltage of the battery and thereby render the battery better prepared for service in the event of a failure or loss of the voltage supplied to the load. The combined current supplied to the load and to the battery may be further limited to some maximum value so as to prevent components of the power supply circuit from being damaged or destroyed by excessive values of current. It may further be desirable that the load be given priority as to its current needs, that is, that the load be supplied first and at all times with its current needs, with the remainder of the maximum available current being made available to the battery for charging purposes.

The present invention is directed to a simple, low-cost dc power supply circuit which satisfies the above consideration and requirements.

BRIEF SUMMARY OF THE INVENTION

In accordance with the present invention a dc power supply circuit is provided for supplying simultaneously dc voltages to a dc load and to a storage device. The dc load and the storage device operate to draw varying amounts of current within corresponding ranges of current and have a predetermined maximum permissible value of current which may be drawn jointly thereby at any given instant.

The dc power supply circuit in accordance with the invention includes a dc source means operative to provide a dc voltage. A first circuit means is coupled to the dc source means and to the dc load and operates in response to a dc voltage provided by the dc source means to supply a dc voltage of a predetermined fixed value to the dc load for enabling the dc load to draw current and, as the current drawn by the dc load varies within its associated range of values, to maintain the dc voltage supplied to the dc load at the predetermined fixed value. A second circuit means coupled to the dc source means and to the storage device operates in response to the aforesaid dc voltage provided by the dc source means to supply a dc voltage to the storage device for enabling the storage device to draw current.

The dc power supply circuit in accordance with the invention further includes a current sensing means and a control circuit means. The current sensing means is connected in circuit with the first and second circuit means and the dc load and storage device and operates to sense the current drawn jointly by the dc load and the storage device and to produce a signal indicative thereof. The control circuit means is coupled to the current sensing means and to the second circuit means and operates in response to the signal produced by the current sensing means as current is sensed by the current sensing means to cause the second circuit means to supply a dc voltage to the storage device. This dc voltage has a value at any given instant for enabling the storage device to draw current of a value equal to the difference between the then existing value of current drawn by the dc load and the predetermined maximum permissible value of current which may be drawn jointly by the dc load and the storage device. As the value of current drawn by the dc load and the storage device varies and is sensed by the current sensing means as described above, the value of the dc voltage supplied by the second circuit means to the storage device and the current drawn by the storage device also vary in accordance with the variation in current sensed by the current sensing means.

BRIEF DESCRIPTION OF THE DRAWING

Various objects, features and advantages of a dc power supply circuit in accordance with the invention will be apparent from the following description taken in conjunction with the accompanying drawing in which the single FIGURE is a schematic diagram of a dc power supply circuit in accordance with the invention.

DETAILED DESCRIPTION OF THE INVENTION

Referring now to the single FIGURE, there is shown a schematic diagram of a dc power supply circuit 1 in accordance with the present invention. The power supply circuit 1 is adapted to supply simultaneously dc voltages to a dc load 3 and to a standby battery 4. The dc load 3 is a variable-current load and typically includes components, such as relays and integrated circuits, which have varying power demands and/or duty cycles as a result of which the current drawn by the dc load 3 varies over a wide range of values. The standby battery 4 is of a rechargeable type and, as will be discussed in detail hereinafter, is adapted to be charged to a desired maximum value and to be connected with the dc load 3, specifically, by circuitry shown at 5, upon the loss or reduction in the value of dc voltage supplied to the dc load 3.

The dc voltages for operating the dc load 3 and for charging the battery 4 are derived from an ac input voltage applied across a primary winding T1 of a step-down transformer T. The ac voltage, which may be 110 volt ac line voltage, is stepped down by the transformer T and presented across a secondary winding T2. The stepped down ac voltage is then converted to a dc voltage by a full-wave bridge rectifier circuit 7, comprising four diodes CR1–CR4 interconnected as shown in the FIGURE, and filtered by a storage capacitor C1. For an ac input voltage of 110 volts as mentioned above, the dc voltage established across the capacitor C1 has a typical value of about 11 volts.

The dc voltage established across the capacitor C1 is employed both to derive a fixed dc supply voltage for the dc load 3, for example, +5 volts dc, and also to derive a dc voltage for charging the standby battery 4 to a desired voltage, for example, about +6.5 volts. The fixed dc voltage for the load 3 is derived from the voltage across the capacitor C1 by means of a three-terminal voltage regulator circuit 8 which, as shown in the FIGURE, is connected in series with a current-sensing resistor R1 and a diode CR5. The voltage regulator circuit 8 operates in response to the voltage across the capacitor C1 to initially supply a fixed voltage (5 volts) to the dc load 3 and to maintain this value of voltage as the current drawn by the load 3 varies between its minimum and maximum values. Typical minimum and maximum values of current drawn by the load 3 are 450 ma and 900 ma, respectively.

As the value of current drawn by the load 3 varies between its minimum and maximum values, this current is sensed by the resistor R1, which is of a small value, for example, 0.62 ohms, and a dc voltage is established at an input terminal 8a of the voltage regulator circuit 8 which varies in accordance with variations in the value of the current drawn by the load 3. By way of example, when the load 3 draws current within its range of values of 450 ma to 900 ma, a varying dc voltage of between about 12 volts and 10.2 volts is established at the input terminal 8a of the voltage regulator circuit 8. With the voltage regulator circuit 8 having a control input terminal 8b thereof at a fixed potential, specifically, at ground potential, the voltage regulator circuit 8 operates in response to the abovementioned range of voltages at its input terminal 8a to supply a fixed, regulated value of voltage, specifically, 5 volts, at an output terminal 8c thereof for utilization by the dc load 3. The diode CR5 is an isolation diode and serves to prevent any reverse current flow from the load 3. A suitable implementation of the voltage regulator circuit 8 as discussed hereinabove is an LM340 fixed voltage regulator circuit as manufactured by the National Semiconductor Company, Santa Clara, Calif. Details of this particular voltage regulator circuit are set forth in a publication of the National Semiconductor Company, entitled "Voltage Regulator Handbook", 1977, page 10-34.

As a dc voltage is supplied to the load 3 as discussed hereinabove, a dc voltage for use by the battery 4 is also derived from the dc voltage across the capacitor C1 and made available to the battery 4 for charging the battery 4. As the aforementioned fixed dc voltage (5 volts) is supplied to the load 3, a dc voltage is also established at an input terminal 10a of an adjustable voltage regulator circuit 10. The voltage regulator circuit 10, to be discussed in greater detail hereinafter, operates in response to the voltage at its input terminal 10a to produce a dc voltage at an output terminal 10c which may then be coupled through a diode CR6 and a switch S in a first position as shown in the FIGURE to the battery 4. The voltage supplied to the battery 4 may then be used for charging the battery 4 to its desired value of voltage (6.5 volts). The battery 4 may be implemented by a sealed battery of a lead-acid type with a rating of 2.5 ampere-hours. As will also be discussed hereinafter, the value of voltage made available to, and the current drawn by, the battery 4 is subject to variation as the value of the current drawn by the load 3 varies between its minimum and maximum values. The diode CR6 is an isolation diode and serves to prevent any reverse discharge of the battery 4.

In accordance with the present invention, the maximum possible current which may be drawn jointly by the load 3 and the battery 4 is established at about one ampere. This value is selected so as to insure that components of the power supply circuit 1, especially the step-down transformer T, are not damaged or destroyed by excessive values of current. Further, in accordance with the present invention, the total current of one ampere available to the load 3 and to the battery 4 is apportioned on a varying basis between the load 3 and the battery 4. By way of example, if the load 3 draws current of a value of 500 ma, the difference between this value of current and one ampere, or 500 ma, is made available to the battery 4 for charging the battery 4. For the aforementioned variation in current drawn by the load 3 of 450–900 ma, the current made available to the battery 4 varies between 550 ma and 100 ma. Further, in accordance with the present invention, the needs of the load 3 are always served first, that is, given first priority, with the needs of the battery 4 being served secondarily and only after the load 3 has been supplied with its needed current. This preferential situation arises since the needs of the dc load 3 are of a short-term nature, that is, more or less immediate, while the charging of the battery 4 to its desired value is a long-term consideration, for example, about 24 hours, and to be utilized upon loss or reduction of dc power to the load 3.

As mentioned above, the current needs of the dc load 3 are always satisfied first, that is, before the current needs of the battery 4. This satisfaction of the current needs of the load 3 is achieved by the use of the voltage regulator circuit 8 of the fixed type. So long as the dc voltage across the capacitor C1 is in excess of about 10–11 volts and the dc voltage at the input terminal 8a of the voltage regulator circuit 8 is above a specified value (e.g., 8 volts), the load 3 is permitted to draw as much current as it needs within its operating range of 450 ma–900 ma. The difference between the value of the current drawn by the load 3 at any given time and the aforementioned maximum value of one ampere is therefore made available for use by the battery 4 for charging purposes. The manner in which this current is made available to the battery 4 is as follows.

As current of a particular value is drawn by the load 3 and the battery 4 also draws current, the combined current is sensed by the resistor R1, causing a voltage to be established thereacross and to be coupled via a current-limiting resistor R2 to the base of a pnp transistor Q1. When this voltage is of sufficient value to forward bias the base-emitter junction of the transistor Q1, the transistor Q1 operates in a conducting state. As the transistor Q1 operates in its conducting state, current flows in the collector circuit of the transistor Q1 and through resistors R3 and R4 connected in series between the collector of the transistor Q1 and ground potential. As current flows through the resistor R3, which is a current-limiting resistor for an npn transistor Q2, a voltage is established at the base of the transistor Q2 which is of sufficient value to forward bias the base-emitter junction of the transistor Q2 into conduction. A capacitor C2 is connected between the base of the transistor Q2 and ground potential for preventing the voltage supply circuit 1 from oscillating. The resistor R4 serves to keep the transistor Q2 in its non-conducting state when the transistor Q1 is in its non-conducting state.

As the transistor Q2 operates in its conducting state, a voltage is produced at its collector and, at the same time, a resistor R5 employed together with a variable resistor R6 for setting the operating voltage levels for the adjustable voltage regulator circuit 10 is caused to be shunted. As a result, a voltage is established at a control input terminal 10b of the voltage regulator circuit 10 which in turn causes the voltage regulator circuit 10 to produce a dc output voltage at its output terminal 10c. This output voltage is applied to the battery 4 and has a value which causes current to be supplied to the battery 4 having a value equal to the difference between the value of the current drawn by the load 3 and the maximum possible combined current of one ampere. As the current drawn by the load 3 increases or decreases from any particular instantaneous value, the transistors Q1 and Q2 respectively conduct more fully or less fully, causing corresponding changes in the values of the dc voltage at the control input terminal 10b and at the output terminal 10c of the voltage regulator circuit 10. More particularly, as the current drawn by the load 3 increases from a given value, a greater value of current is sensed by the resistor R1, causing greater conduction in the transistors Q1 and Q2 and decreases in the values of the voltages at the control input terminal 10b and at the output terminal 10c of the voltage regulator circuit 10. As a result of these voltage decreases, the value of current drawn by the battery 4 also decreases. As the current drawn by the load decreases from a given value, a lesser value of current is sensed by the resistor R1, causing reduced conduction in the transistors Q1 and Q2 and increases in the values of the voltages at the control input terminal 10b and at the output terminal 10c of the voltage regulator circuit 10. As a result of these voltage increases, the value of current drawn by the battery 4 also increases. As the current drawn by the load 3 varies between its minimum value of 450 ma and its maximum value of 900 ma, the value of the voltage at the output terminal 10c of the voltage regulator circuit 10 varies between about +7 volts and +6 volts dc.

The abovementioned 7-volt signal is established at the output terminal 10c of the voltage regulator circuit 10, specifically, by the resistors R5 and R6, at such time as the current sensed by the resistor R1 is insufficient to cause conduction in the transistors Q1 and Q2. At this time, the battery 4 is considered fully charged and only a small amount of current is supplied to and drawn by the battery 4 for trickle charging the battery 4. When the current sensed by the resistor R1 is at the maximum possible value of one ampere, the voltage at the output 10c of the voltage regulator circuit 10 is established at the aforementioned value of about +6 volts dc which will limit the current to the battery 4. The battery 4 is therefore prevented from receiving more current than the difference between the value of current drawn by the load 3 and one ampere. As a result of limiting the current supplied to the battery 4, the components of the power supply circuit 1, such as the step-down transformer T, are prevented from being damaged or destroyed. The voltage regulator circuit 10 as described hereinabove may be suitably implemented by an LM317 three-terminal adjustable voltage regulator circuit as manufactured by the National Semiconductor Company. Such a voltage regulator circuit is described in detail in the aforementioned publication entitled "Voltage Regulator Handbook", at page 10-4.

The battery 4 as described hereinabove is intended to be placed into service for use by the load 3 upon a power or other failure leading to a loss or reduction in the value of the power supplied to the load 3. This failure condition is detected by a detector circuit 11 which monitors the value of the dc voltage across the capacitor C1. At such time as the dc voltage across the capacitor C1 drops below a predetermined value indicating a loss or reduction of power or other failure condition, the circuit 11 operates to connect a relay winding R in circuit with the input of the load 3 to enable the relay winding R to be energized and to cause the aforementioned switch S associated with the relay winding R to switch from its first position as shown in the FIGURE to a second position. With the switch S in its second position, the battery 4 is coupled through the switch S to a simple voltage regulator circuit 12. The voltage of the battery 4 is applied across a pair of resistors R7 and R8, the juncture of which is coupled to the base of an npn transistor Q3 and through a stabilization capacitor C3 to ground potential. The voltage regulator circuit 12 operates to regulate the battery voltage received thereby to a fixed value of about +5 volts dc which is then applied to the load 3 for utilization by the load 3 in the same manner as the dc voltage supplied thereto via the voltage regulator circuit 8. The dc voltage from the battery 4 also serves to maintain the relay winding R in its energized state so that the switch S remains in its second position and the battery 4 remains coupled to the load 3. Although the circuit 11 as described above may be implemented in any one of several different ways, a particularly suitable implementation is disclosed and claimed in the aforementioned co-pending application of Robert J. Fahey.

Some suitable values of components which may be used in the dc power supply circuit 1 as described hereinabove are as follows:

CR1–CR5: MR502
CR6: IN4003
C1: 3300 microfarads
C2: 0.1 microfarad
C3: 47 microfarads
R1: 0.62 ohms
R2: 1 Kilohm
R3: 3.3 Kilohm
R4: 10 Kilohms
R5: 1.5 Kilohms
R6: 270 ohms
R7: 15 ohms
R8: 350 ohms
Q1: 2N3906
Q2: 2N3904
Q3: TIP31A While there has been described what is considered to be a preferred embodiment of the invention it will be apparent to those skilled in the art that various changes and modifications may be made therein without departing from the invention as called for in the appended claims.

What is claimed is:

1. A dc power supply circuit for supplying simultaneously dc voltages to a dc load and to a storage device, said dc load and storage device being operative to draw varying amounts of current within corresponding ranges of current and having a predetermined maximum permissible value of current which may be drawn jointly thereby at any given instant, said dc power supply circuit comprising:

dc source means operative to provide a dc voltage;

first circuit means coupled to the dc source means and to the dc load, said first circuit means being operative in response to a dc voltage provided by the dc source means to supply a dc voltage of a predetermined fixed value to the dc load for enabling the dc load to draw current and, as the current drawn by the dc load varies within its associated range of values, to maintain the dc voltage supplied to the dc load at the predetermined fixed value;

second circuit means coupled to the dc source means and to the storage device and operative in response to the aforesaid dc voltage provided by the dc source means to supply a dc voltage to the storage device for enabling the storage device to draw current;

current sensing means in circuit with the first and second circuit means and the dc load and storage device and operative to sense the current drawn jointly by the dc load and the storage device and to produce a signal indicative thereof; and control circuit means coupled to the current sensing means and to the second circuit means, said control circuit means being operative in response to the signal produced by the current sensing means as current is sensed by the current sensing means to cause the second circuit means to supply a dc voltage to the storage device, said dc voltage having a value at any given instant for enabling the storage device to draw current of a value equal to the difference between the then existing value of current drawn by the dc load and the predetermined maximum permissible value of current which may be drawn jointly by the dc load and the storage device, whereby as the value of current drawn by the dc load and the storage device varies and is sensed by the current sensing means the value of the dc voltage supplied by the second circuit means to the storage device and the current drawn by the storage device also vary in accordance with the variation in current sensed by the current sensing means.

2. A dc power supply circuit in accordance with claim 1 wherein:

the storage battery device is an electrical storage battery.

3. A dc power supply circuit in accordance with claim 1 wherein:

the first circuit means includes:

fixed voltage regulator circuit means having an input terminal, an output terminal, and a control terminal, said current sensing means being coupled between the dc source means and the input terminal of the fixed voltage regulator circuit means, and the output terminal and control terminal of the fixed voltage regulator circuit means being coupled, respectively, to the dc load and to a source of reference potential, said fixed voltage regulator circuit means being operative in response to a dc voltage provided by the dc source means to supply a dc voltage of a predetermined fixed value at its output terminal to the load and, as the value of current drawn by the dc load varies causing a varying dc voltage at the input terminal, to regulate the varying dc voltage to the predetermined fixed value at its output terminal.

4. A dc power supply circuit in accordance with claim 3 wherein:

the second circuit means includes:

adjustable voltage regulator circuit means having an input terminal, an output terminal coupled to the storage device, and a control terminal, said current sensing means being coupled between the dc source means and the input terminal of the adjustable voltage regulator circuit means, and said control circuit means being coupled to the current sensing means and to the control and output terminals of the adjustable voltage regulator circuit means; and voltage-setting means coupled between the output terminal of the adjustable voltage regulator circuit means and a source of reference potential for setting operating levels of the adjustable voltage regulator circuit means;

said adjustable voltage regulator circuit means and voltage-setting means being operative in response to a dc voltage provided by the dc source means to supply a dc voltage at the output terminal of the adjustable voltage regulator circuit means to the storage device for enabling the storage device to draw current; and said control circuit means being operative in response to the signal produced by the current sensing means as current is sensed by the current sensing means to establish a voltage at the control terminal of the adjustable voltage regulator circuit means of a value to cause the adjustable voltage regulator circuit means to supply a dc voltage at its output terminal to the storage device, said dc voltage at the output terminal of the adjustable voltage regulator circuit means having a value at any given instant for enabling the storage device to draw current of a value equal to the difference between the then existing value of current drawn by the dc load and the predetermined maximum permissible value of current which may be drawn jointly by the dc load and storage device, whereby as the value of current drawn by the dc load and the storage device varies and is sensed by the current sensing means the values of the dc voltages at the control and output terminals of the adjustable voltage regulator circuit means and the current drawn by the storage device also vary in accordance with the variation in the current sensed by the current sensing means.

5. A dc power supply circuit in accordance with claim 4 wherein:

the current sensing means includes a resistance element.

6. A dc power supply circuit in accordance with claim 5 wherein:

the storage device is an electrical storage battery.

7. A dc power supply circuit in accordance with claim 6 wherein:

the control circuit means includes:

a first transistor of a first conductivity type having a base, emitter and collector, the base and emitter being coupled to opposite ends of the resistance element of the current sensing means; and a second transistor of a second conductivity type having base, emitter and collector, the base being coupled to the collector of the first transistor, the emitter being coupled to the source of reference potential, and the collector being coupled to the control terminal of the adjustable voltage regulator circuit means.

8. A dc power supply circuit in accordance with claim 7 wherein:

the voltage-setting means of the second circuit means includes resistance means coupled between the output terminal of the adjustable voltage regulator circuit means and the source of reference potential and to the collector of the second transistor.

9. A dc power supply circuit in accordance with claim 8 wherein:

the dc source means comprises:

transformer means operative to receive an ac voltage of a predetermined value and to transform said ac voltage to a different value;

ac-to-dc converter means coupled to the transformer means and operative to convert the transformed ac voltage of the transformer means to a dc voltage; and storage means coupled to the ac-to-dc converter means and operative to receive and retain the dc voltage produced by the ac-to-dc converter means.

10. A dc power supply circuit in accordance with claim 9 wherein:

the storage means of the dc source means includes a capacitance element.

* * * * *